United States Patent
Zhu et al.

(10) Patent No.: US 10,651,888 B2
(45) Date of Patent: May 12, 2020

(54) M-ARY DIRECT SEQUENCE SPREAD SPECTRUM COMMUNICATION METHOD

(71) Applicant: Shenzhen Neotecway Electronic Technology Co., Ltd, Shenzhen (CN)

(72) Inventors: Wenwen Zhu, Shenzhen (CN); Jian Ma, Shenzhen (CN); Minghui Zeng, Shenzhen (CN)

(*) Notice: Subject to any disclaimer, the term of this patent is extended or adjusted under 35 U.S.C. 154(b) by 0 days.

(21) Appl. No.: 16/461,756

(22) PCT Filed: Dec. 7, 2016

(86) PCT No.: PCT/CN2016/108772
§ 371 (c)(1),
(2) Date: May 16, 2019

(87) PCT Pub. No.: WO2018/090408
PCT Pub. Date: May 24, 2018

(65) Prior Publication Data
US 2019/0363751 A1  Nov. 28, 2019

(30) Foreign Application Priority Data
Nov. 16, 2016 (CN) .......................... 2016 1 1022232

(51) Int. Cl.
*H04W 84/18* (2009.01)
*H04B 1/707* (2011.01)
*H04L 27/18* (2006.01)

(52) U.S. Cl.
CPC ............. *H04B 1/707* (2013.01); *H04L 27/18* (2013.01); *H04W 84/18* (2013.01)

(58) Field of Classification Search
USPC ................................................. 375/147, 340
See application file for complete search history.

(56) References Cited

U.S. PATENT DOCUMENTS

| | | | |
|---|---|---|---|
| 9,853,742 B1* | 12/2017 | Radosevic | H04B 11/00 |
| 2009/0290660 A1* | 11/2009 | Neugebauer | H04B 1/707 |
| | | | 375/340 |
| 2010/0124269 A1 | 5/2010 | Lee et al. | |
| 2010/0290506 A1* | 11/2010 | Kerr | H04B 1/7075 |
| | | | 375/147 |
| 2014/0171030 A1* | 6/2014 | Karabinis | H04B 1/69 |
| | | | 455/411 |
| 2014/0233527 A1* | 8/2014 | Gehring | H04R 25/554 |
| | | | 370/330 |

FOREIGN PATENT DOCUMENTS

| | | |
|---|---|---|
| CN | 101414850 A | 4/2009 |
| CN | 101547020 A | 9/2009 |
| CN | 103152074 A | 6/2013 |
| CN | 105406897 A | 3/2016 |

* cited by examiner

*Primary Examiner* — Eva Y Puente
(74) *Attorney, Agent, or Firm* — Novoclaims Patent Services LLC; Mei Lin Wong

(57) ABSTRACT

Disclosed is an M-ary direct sequence spread spectrum communication method. The method involves: filling a one-bit M-ary-number of code elements between two spread spectrum sequence codes; and during despreading, obtaining the number of code elements filled between the two spread spectrum sequence codes so as to obtain one-bit M-ary data. Provided is a spread spectrum communication method having high communication efficiency.

12 Claims, 1 Drawing Sheet

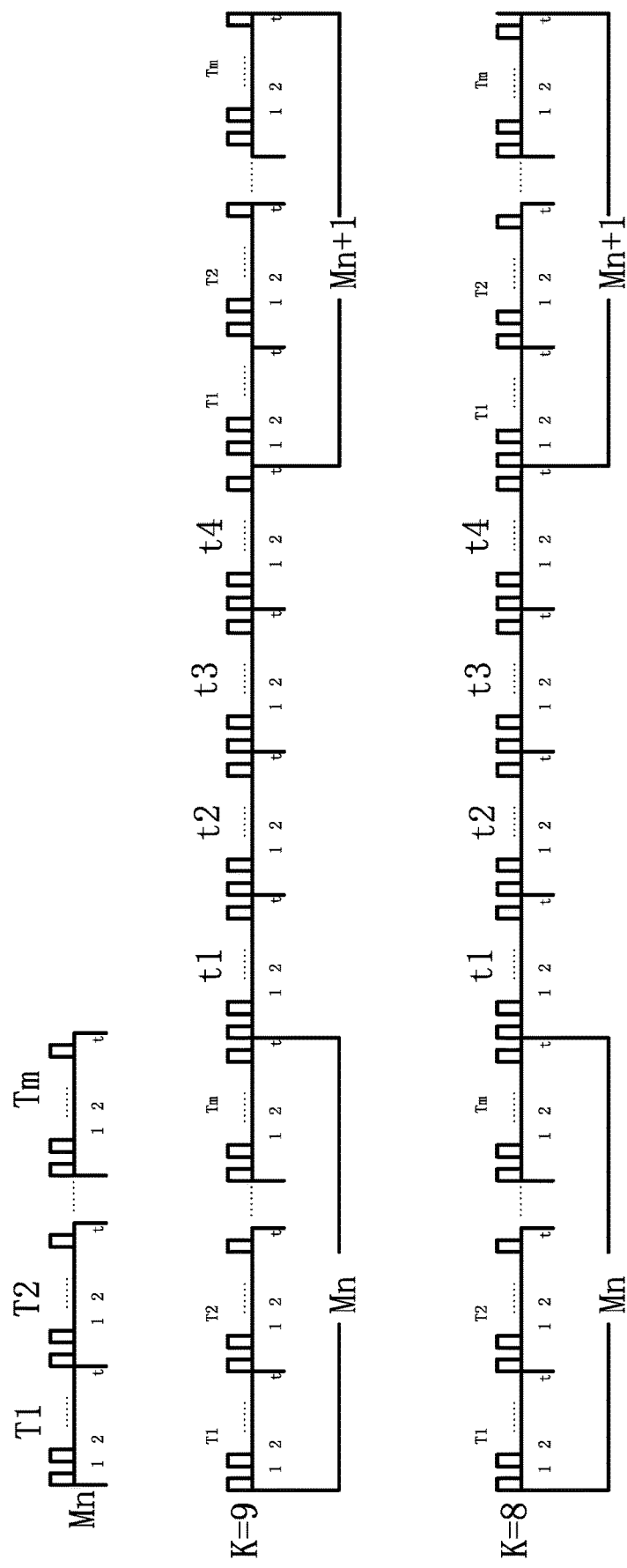

M-ARY DIRECT SEQUENCE SPREAD SPECTRUM COMMUNICATION METHOD

BACKGROUND OF THE PRESENT INVENTION

Field of Invention

The present invention relates to the field of spread spectrum communication methods, in particularly to a multi-input direct sequence spread spectrum communication method.

Description of Related Arts

The working mode of Direct sequence spread spectrum (Direct Sequence Spread Spectrum) is referred to as Direct Spreading (DS). The spectrum of a signal is spread at a transmitter end by a high-speed spread spectrum sequence, and then de-spread at the receiving end by using the same spreading code sequence, and the spread spectrum signals are restored into original signals. The mode of direct sequence spread spectrum is used for modulating carrier wave by using a pseudo noise sequence, the data information to be transmitted needs to undergo channel coding processing, and then modulating with the pseudo noise sequence and generating a composite code to modulate carrier wave.

At present, direct sequence spread spectrum communication uses multi-bit spread spectrum code to represent one data bit, which can generate a certain spread spectrum gain and reduce the communication error rate. Meanwhile, since the data rate is reduced in direct sequence spread spectrum, a great loss to the communication efficiency is resulted.

SUMMARY OF THE PRESENT INVENTION

In view of the current inadequacy of direct sequence spread spectrum communication which has the problem of data loss, and a great loss in the communication efficiency, the present invention provides a M-ary direct sequence spread spectrum communication method.

According to the present invention, the technical solution used to achieve its purpose is: a M-ary direct sequence spread spectrum communication method, which includes a spectrum spreading method and a spectrum de-spreading method.

The spectrum spreading method comprises:

A1, label a single symbol as T, the symbol T is composed of t number of consecutive clock cycles; t is a natural number;

A2, take a direct sequence spreading code M, M is composed of m number of symbols T, m is a natural number;

A3, define a data sequence $M_0M_1M_2 \ldots M_nM_{n+1} \ldots$; n is a natural number;

A4, encode a source signal to form data k of K-ary; k is $0, 1, 2, \ldots K-1$;

A5, insert j number of symbol T into bit intervals of $M_0M_1M_2 \ldots M_nM_{n+1} \ldots$, where $j=f(k)$, where j is a natural number, $$0 \le j < \frac{K+1}{2},$$

$f(x)$ is a monotonically increasing function in the range 0 to $$\frac{K+1}{2},$$

and the phase difference between $M_n$ and $M_{n+1}$ is defined by $f(k)$.

The spectrum de-spreading method comprises:

B1, obtain a direct sequence spreading code $M_n$;

B2, obtain a direct sequence spreading code of the subsequent section $M_{n+1}$;

B3, determine the number j of the symbol T between intervals of the direct sequence spreading code $M_n$ and the direct sequence spreading code of the subsequent section $M_{n+1}$;

B4, calculate k according to the inverse function $k=f'(j)$ of $j=f(k)j$.

According to the present invention, the communication efficiency is relatively higher while partial gain of direct sequence spread spectrum is retained.

Furthermore, according to the above M-ary direct sequence spread spectrum communication method, the symbol T is a PSK modulation symbol.

Furthermore, according to the above M-ary direct sequence spread spectrum communication method, the phase change existed between consecutive symbols T in the direct sequence spreading code M is determined by the spreading code.

Furthermore, according to the above M-ary direct sequence spread spectrum communication method, in the step 5, the symbol T inserted into bit intervals of $M_0M_1 M_2 \ldots M_nM_{n+1} \ldots$ is a symbol with continuous phase.

Furthermore, according to the above M-ary direct sequence spread spectrum communication method, in the step B2, further comprises the following steps:

B201, select and take a direct sequence spreading code for the next subsequent section M;

B202, perform an entire phase comparison between the direct sequence spreading code for the next subsequent section M and the direct sequence spreading code $M_n$, record the phase difference $P_0$;

B203, skip one PSK symbol T, then select a piece of spreading code M to compare the phase with the direct sequence spreading code $M_n$, record the phase difference $P_1$;

B204, repeating the above step and recording the phase difference $P_2$, $P_3$, until $P_K$;

B205, the median of the maximum value $P_{max}$ and the minimum value $P_{min}$ of the theoretical phase difference between $M_n$ and $M_{n+1}$ is $$P_{mid} = \frac{P_{max} + P_{min}}{2};$$

take the maximum deviation absolute value $P_{dif}$ of $P_0P_1 P_2 \ldots P_K$ which is relative to $P_{mid}$, the direct sequence spreading code M at this time is the direct sequence spreading code of the subsequent section $M_{n+1}$ of the direct sequence spreading code $M_n$; value which is corresponding to $P_{dif}$ is $P_j$, where j is the number of inserted symbols T;

Furthermore, according to the above M-ary direct sequence spread spectrum communication method, in the step A5, $$j = \left[\frac{k}{2}\right],$$

where [ ] represents rounding operation; when k is an even number, make the phases of the two consecutive sequences Mn and Mn+1 the same, when k is an odd number, make the phases of the two consecutive sequences Mn and Mn+1 opposite to each other.

In the step B4, determine the phase difference between Mn and Mn+1, if the phases are the same, then corresponding to the minimum phase difference, the demodulated data is an even number k=2j, if the phases are opposite, then corresponding to the maximum phase difference, the demodulated data is an odd number k=2j+1.

The present invention will be described in detail below with reference to specific embodiments.

BRIEF DESCRIPTION OF THE DRAWINGS

FIG. 1 is a schematic diagram showing a spectrum spreading method of the present invention.

DETAILED DESCRIPTION OF THE PREFERRED EMBODIMENT

Embodiment 1

This embodiment is a method for using a M-ary PSK direct sequence spread spectrum communication in power line carrier communication. This method can improve communication efficiency while retaining the partial gain of direct sequence spread spectrum.

Label a single symbol PSK as T, the symbol T consists of t consecutive clock cycles. t is a natural number. As shown in FIG. 1, the first line in the FIGURE indicates that the symbol is composed of m number of single PSK symbols T. Here, the single PSK symbol T is formed by an array of t number of clock sequence. In practice, the phase of each clock is set as needed. For example, in binary, each clock has two phases which is represented by "0" and "1" respectively. For example, a clock cycle which uses a pulse with ½ duty cycle, "0" means that the high level is first (0 phase), and "1" means that the high level is after (the reverse phase is 180 degrees). Of course, there are other ways. For a single PSK symbol T, t clock units can be defined as needed to determine its phase. For another symbol T, reverse phase or other manner can be used, thus a single PSK symbol T can be determined from its phase to represent "0" and "1".

Take the direct sequence spreading code as M, M consists of m number of symbols T, T0 T1 . . . T(m−1), and the phase change existing between consecutive symbols T is determined by the spreading code. m is a natural number. Thus, the direct sequence spreading code M can be a set of binary codes.

In this embodiment, PSK M-ary direct sequence spread spectrum communication, such as K-ary, is used. The sender insert $$\left[\frac{k}{2}\right]$$

in the above M0 M1 M2 . . . Mn Mn+1 . . . bit interval to take the entire PSK symbol, (0≤k<K), where k is the M-ary data bit to be transmitted. Further, if k is an even number, the phases of the two M sequences before and after are kept continuous, and the phase difference is 0; if k is an odd number, the phases of the two M sequences before and after are opposite, and the phase difference is the largest.

When k==0, the transmission sequence is $M_n M_{n+1}$ and $M_n$ and $M_{n+1}$ are in phase;

When k==1, the transmission sequence is $M_n M_{n+1}$ and $M_n$ and $M_{n+1}$ are out of phase;

When 1<k<K and k is an even number, the transmission sequence is $$M_n T_1 T_2 \ldots T_{\frac{K}{2}} M_{n+1},$$

and $M_n$ and $M_{n+1}$ are in phase;

When 1<k<K and k is an odd number, the transmission sequence is and $M_n$ and $M_{n+1}$ are out of phase;

$$M_n T_1 T_2 \ldots T_{\frac{K}{2}} M_{n+1},$$

As shown in FIG. 1, when a hexadecimal number is used, K=16, when k=8, insert T1, T2, T3, T4 between two adjacent M sequences, $M_n$ and $M_{n+1}$ are in phase. When K=9, insert T1, T2, T3, T4 between two adjacent M sequences, $M_n$ and $M_{n+1}$ are out of phase.

The receiver needs to demodulate k to obtain the M-ary data transmitted from the sender.

The demodulation method is: after $M_n$, select the next spreading code M, then compare the phase with the entire $M_n$, record the phase difference $P_0$. A method of entire phase comparison is preforming phase difference calculations and finding the sum of the two sequences for each corresponding clock cycle in chronological order. Then skip one PSK symbol and select a piece of spreading code M, and compare the phase with $M_n$, record the phase difference $P_1$, then record the phase difference $P_2 \ldots P_J$ and so on, where $$J = \frac{K-1}{2}.$$

Take the median of the maximum value $P_{max}$ and the minimum value $P_{min}$ of the theoretical phase difference between $M_n$ and $M_{n+1}$, the median of the maximum value $P_{max}$ and the minimum value $P_{min}$ is $$P_{mid} = \frac{P_{max} + P_{min}}{2}.$$

In this embodiment, $P_{min}$ is 0, $P_0 P_1 P_2 \ldots P_K$ is relative to the maximum deviation absolute value $P_{dif}$ of $P_{mid}$, record its position $t_j$. At this time, the direct sequence spreading code M is the next direct sequence spreading code $M_{n+1}$ of the direct sequence spreading code $M_n$; the one which is corresponding to $P_{dif}$ is $P_j$.

Due to the characteristics of the direct sequence spread spectrum code, if M is selected incorrectly which contains a section of $$T_1 - \frac{T_K}{2},$$

then the phase difference between M and $M_n$ will be significantly different from the phase difference between $M_n$ and $M_{n+1}$.

If the phases are the same, $P_{dif}$ is negative, which is corresponding to the minimum phase difference, the demodulated data is an even number k=2j; if the phase is opposite, $P_{dif}$ is positive, which is corresponding to the maximum phase difference, the demodulated data is an odd number k=2j+1.

The above function $f(x)$ is rounded up by $$\left\lceil \frac{x}{2} \right\rceil,$$

and there are other ways of function, such as $f(x)=x$.

Here, when K is 2, k is 0 or 1, which is also a binary number.

When k==0, the transmission sequence is $M_n M_{n+1}$ and $M_n$ and $M_{n+1}$ are in phase;

When k==1, the transmission sequence is $M_n M_{n+1}$ and $M_n$ and $M_{n+1}$ are out of phase;

There is no T sequence between $M_n M_{n+1}$. This evident that the method of this embodiment is seen to be equivalent to ordinary binary spread spectrum under a binary system.

However, when the direct sequence spread code bit number M is much larger than the K of a K-ary system, such as if it is hex, K is 16, the method of the present invention has a higher communication efficiency. For example, for a 63-bit spreading code, in the transmission of 16-ary data, the worst efficiency is binary transmission (32*63)/((63+(16-1)/2)*8)= 3.6 times, of which 32 is the number of bits in binary, 16 is a decimal number, and 8 is the number of bits corresponding to 16-ary. The worst efficiency corresponds to the case where 32-bit data is transmitted as 0xFFFFFFFF, and the average efficiency is higher under normal situation.

What is claimed is:

1. An improved direct sequence spread spectrum communication method, comprising a spectrum spreading method and a spectrum de-spreading method executed on a processor, wherein said spectrum spreading method comprises the steps of:
    A1, labeling a single symbol as T, the symbol T is composed of t number of consecutive clock cycles; t is a natural number;
    A2, taking a direct sequence spreading code which is represented by M, M is composed of m number of symbols T, m is a natural number;
    A3, defining a data sequence $M_0 M_1 M_2 \ldots M_n M_{n+1} \ldots$; n is a natural number;
    A4, encoding a source signal to form data k of K-ary; k is 0, 1, 2, ... K-1;
    A5, inserting j number of symbol T into bit intervals of $M_0 M_1 M_2 \ldots M_n M_{n+1} \ldots$, where j=f(k), where j is a natural number, $$0 \le j < \frac{K+1}{2},$$

$f(x)$ is a monotonically increasing function in the range 0 to $$\frac{K+1}{2},$$

and the phase difference between $M_n$ and $M_{n+1}$ is defined by $f(k)$;

said spectrum de-spreading method comprises the steps of:
    B1, obtaining a direct sequence spreading code $M_n$;
    B2, obtaining a direct sequence spreading code of the subsequent section $M_{n+1}$;
    B3, determining the number j of the symbol T between intervals of the direct sequence spreading code $M_n$ and the direct sequence spreading code of the subsequent section $M_{n+1}$;
    B4, calculating k according to an inverse function k=f'(j) of j=f(k)j.

2. The improved direct sequence spread spectrum communication method according to claim 1, wherein the symbol T is a PSK modulation symbol.

3. The improved direct sequence spread spectrum communication method according to claim 2, wherein a phase change existed between consecutive symbols T in the direct sequence spreading code M is determined by the spreading code.

4. The improved direct sequence spread spectrum communication method according to claim 2, wherein in the step A5, the symbol T inserted into bit intervals of $M_0 M_1 M_2 \ldots M_n M_{n+1} \ldots$ is a symbol with continuous phase.

5. The improved direct sequence spread spectrum communication method according to claim 1, wherein in the step B2, further comprising the following steps:
    B201, select and take a direct sequence spreading code for a next subsequent section M;
    B202, perform an entire phase comparison between the direct sequence spreading code for the next subsequent section M and the direct sequence spreading code $M_n$, record a phase difference $P_0$;
    B203, skip one PSK symbol T, then select a piece of spreading code M to compare a phase with the direct sequence spreading code $M_n$, record the phase difference $P_1$;
    B204, repeating the above step and recording a phase difference $P_2$, $P_3$, until $P_K$; and
    B205, a median of the maximum value $P_{max}$ and the minimum value $P_{min}$ of a theoretical phase difference between $M_n$ and $M_{n+1}$ is $$P_{mid} = \frac{P_{max} + P_{min}}{2};$$

take the maximum deviation absolute value $P_{dif}$ of $P_0 P_1 P_2 \ldots P_K$ which is relative to $P_{mid}$, the direct sequence spreading code M at this time is the direct sequence spreading code of the subsequent section $M_{n+1}$ of the direct sequence spreading code $M_n$; $P_j$ is corresponding to $P_{dif}$, where j is the number of inserted symbols T.

6. The improved direct sequence spread spectrum communication method according to claim 2, wherein in the step B2, further comprising the following steps:
    B201, select and take a direct sequence spreading code for a next subsequent section M;
    B202, perform an entire phase comparison between the direct sequence spreading code for the next subsequent section M and the direct sequence spreading code $M_n$, record a phase difference $P_0$;
    B203, skip one PSK symbol T, then select a piece of spreading code M to compare a phase with the direct sequence spreading code $M_n$, record the phase difference $P_1$;

B204, repeating the above step and recording a phase difference $P_2$, $P_3$, until $P_K$;

B205, a median of the maximum value $P_{max}$ and the minimum value $P_{min}$ of a theoretical phase difference between $M_n$ and $M_{n+1}$ is $$P_{mid} = \frac{P_{max} + P_{min}}{2};$$

take the maximum deviation absolute value $P_{dif}$ of $P_0P_1 P_2 \ldots P_K$ which is relative to $P_{mid}$, the direct sequence spreading code M at this time is the direct sequence spreading code of the subsequent section $M_{n+1}$ of the direct sequence spreading code $M_n$; $P_J$ is corresponding to $P_{dif}$, where j is the number of inserted symbols T.

7. The improved direct sequence spread spectrum communication method according to claim 5, wherein in the step A5, $$j = \left[\frac{k}{2}\right],$$

where [ ] represents rounding operation; when k is an even number, make the phases of the two consecutive sequences Mn and Mn+1 the same, when k is an odd number, make the phases of the two consecutive sequences Mn and Mn+1 opposite to each other;

in the step B4, determine a phase difference between Mn and Mn+1, if the phases are the same, then corresponding to the minimum phase difference, the demodulated data is an even number k=2j, if the phases are opposite, then corresponding to the maximum phase difference, the demodulated data is an odd number k=2j+1.

8. The improved direct sequence spread spectrum communication method according to claim 3, wherein in the step B2, further comprising the following steps:

B201, select and take a direct sequence spreading code for the next subsequent section M;

B202, perform an entire phase comparison between the direct sequence spreading code for the next subsequent section M and the direct sequence spreading code $M_n$, record a phase difference $P_0$;

B203, skip one PSK symbol T, then select a piece of spreading code M to compare a phase with the direct sequence spreading code $M_n$, record the phase difference $P_1$;

B204, repeating the above step and recording a phase difference $P_2$, $P_3$, until $P_K$;

B205, a median of the maximum value $P_{max}$ and the minimum value $P_{min}$ of a theoretical phase difference between $M_n$ and $M_{n+1}$ is $$P_{mid} = \frac{P_{max} + P_{min}}{2};$$

take the maximum deviation absolute value $P_{dif}$ of $P_0P_1 P_2 \ldots P_K$ which is relative to $P_{mid}$, the direct sequence spreading code M at this time is the direct sequence spreading code of the subsequent section $M_{n+1}$ of the direct sequence spreading code $M_n$; $P_j$ is corresponding to $P_{dif}$, where j is the number of inserted symbols T.

9. The improved direct sequence spread spectrum communication method according to claim 4, wherein in the step B2, further comprising the following steps:

B201, select and take a direct sequence spreading code for a next subsequent section M;

B202, perform an entire phase comparison between the direct sequence spreading code for the next subsequent section M and the direct sequence spreading code $M_n$, record a phase difference $P_0$;

B203, skip one PSK symbol T, then select a piece of spreading code M to compare a phase with the direct sequence spreading code $M_n$, record the phase difference $P_1$;

B204, repeating the above step and recording a phase difference $P_2$, $P_3$, until $P_K$; and B205, a median of the maximum value $P_{max}$ and the minimum value $P_{min}$ of a theoretical phase difference between $M_n$ and $M_{n+1}$ is $$P_{mid} = \frac{P_{max} + P_{min}}{2};$$

take the maximum deviation absolute value $P_{dif}$ of $P_0P_1 P_2 \ldots P_K$ which is relative to $P_{mid}$, the direct sequence spreading code M at this time is the direct sequence spreading code of the subsequent section $M_{n+1}$ of the direct sequence spreading code $M_n$; $P_j$ is corresponding to $P_{dif}$, where j is the number of inserted symbols T.

10. The improved direct sequence spread spectrum communication method according to claim 6, wherein in the step A5, $$j = \left[\frac{k}{2}\right],$$

where [ ] represents rounding operation; when k is an even number, make the phases of the two consecutive sequences Mn and Mn+1 the same, when k is an odd number, make the phases of the two consecutive sequences Mn and Mn+1 opposite to each other;

in the step B4, determine a phase difference between Mn and Mn+1, if the phases are the same, then corresponding to the minimum phase difference, a demodulated data is an even number k=2j, if the phases are opposite, then corresponding to the maximum phase difference, the demodulated data is an odd number k=2j+1.

11. The M-ary direct sequence spread spectrum communication method according to claim 8, wherein in the step A5, $$j = \left[\frac{k}{2}\right],$$

where [ ] represents rounding operation; when k is an even number, make the phases of the two consecutive sequences Mn and Mn+1 the same, when k is an odd number, make the phases of the two consecutive sequences Mn and Mn+1 opposite to each other;

in the step B4, determine a phase difference between Mn and Mn+1, if the phases are the same, then corresponding to the minimum phase difference, a demodulated data is an even number k=2j, if the phases are opposite, then corresponding to the maximum phase difference, the demodulated data is an odd number k=2j+1.

12. The improved direct sequence spread spectrum communication method according to claim 9, wherein in the step A5, $$j = \left[\frac{k}{2}\right],$$

where [ ] represents rounding operation; when k is an even number, make the phases of the two consecutive sequences Mn and Mn+1 the same, when k is an odd number, make the phases of the two consecutive sequences Mn and Mn+1 opposite to each other;

in the step B4, determine a phase difference between Mn and Mn+1, if the phases are the same, then corresponding to the minimum phase difference, a demodulated data is an even number k=2j, if the phases are opposite, then corresponding to the maximum phase difference, the demodulated data is an odd number k=2j+1.

* * * * *